(12) United States Patent
Salesse-Lavergne

(10) Patent No.: US 7,756,612 B2
(45) Date of Patent: Jul. 13, 2010

(54) METHOD AND A DEVICE FOR PROVIDING ASSISTANCE IN PILOTING A ROTORCRAFT AT TAKEOFF

(75) Inventor: Marc Salesse-Lavergne, Marseilles (FR)

(73) Assignee: Eurocopter, Marignane (FR)

( * ) Notice: Subject to any disclaimer, the term of this patent is extended or adjusted under 35 U.S.C. 154(b) by 686 days.

(21) Appl. No.: 11/790,971

(22) Filed: Apr. 30, 2007

(65) Prior Publication Data

US 2008/0161983 A1 Jul. 3, 2008

(30) Foreign Application Priority Data

Apr. 28, 2006 (FR) .................................. 06 03828

(51) Int. Cl.
 *B64C 27/57* (2006.01)
(52) U.S. Cl. .............................. 701/4; 701/7; 244/17.13
(58) Field of Classification Search ...................... 701/4
See application file for complete search history.

(56) References Cited

U.S. PATENT DOCUMENTS 3,407,654 A * 10/1968 Dove ......................... 73/178 T
3,927,306 A * 12/1975 Miller ........................... 701/15
4,628,455 A * 12/1986 Skutecki ......................... 701/7
5,727,754 A * 3/1998 Carter, Jr. ....................... 244/8
5,853,152 A * 12/1998 Evans et al. ................. 244/221
5,951,608 A * 9/1999 Osder ........................... 701/11
5,986,580 A   11/1999 Permanne
6,527,225 B1 * 3/2003 Silder et al. ............... 244/76 R
6,584,382 B2 * 6/2003 Karem ........................... 701/3
2003/0066927 A1 * 4/2003 Salesse-Lavergne ..... 244/17.13
2004/0093130 A1 * 5/2004 Osder et al. ..................... 701/3
2005/0004721 A1 * 1/2005 Einthoven et al. .............. 701/4
2005/0067527 A1 * 3/2005 Petersen .................. 244/17.11
2005/0151004 A1 * 7/2005 Ouellette et al. ........... 244/12.3

FOREIGN PATENT DOCUMENTS

FR    2772718    6/1999
FR    2830630    4/2003

* cited by examiner

*Primary Examiner*—Thomas G Black
*Assistant Examiner*—Shelley Chen
(74) *Attorney, Agent, or Firm*—Young & Thompson

(57) ABSTRACT

The invention relates to a method of piloting a rotorcraft having a plurality of engines for driving at least one lift and propulsion rotor, in which method, so long as the rotorcraft has not reached an optimum climb speed (OCS), a pitch attitude control signal (Upitch) is determined that is adapted so that the rotorcraft accelerates in application of a profile (P1, P2, P3) that varies as a function of the elapsed time and as a function of the operating state of the engines (OEI/AEO).

11 Claims, 2 Drawing Sheets

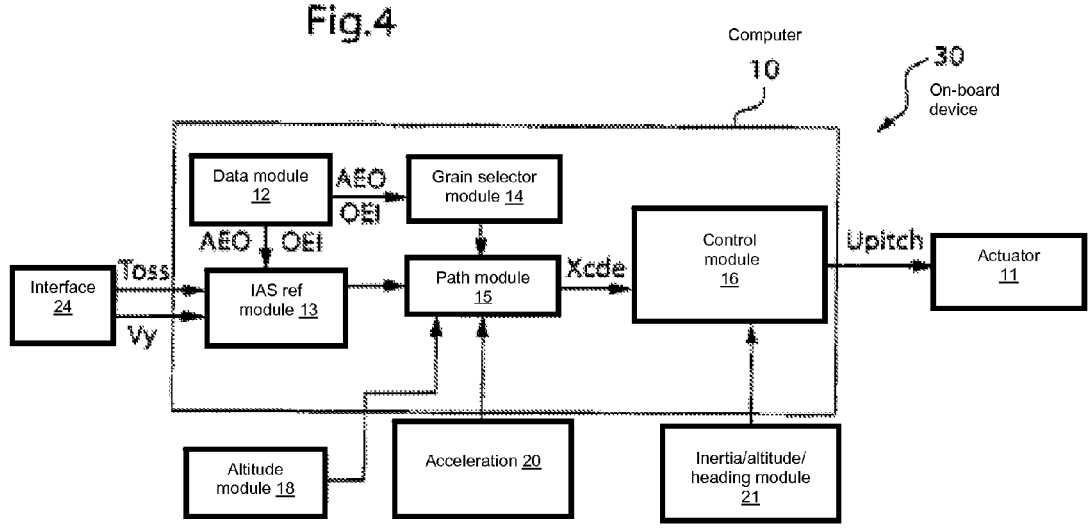
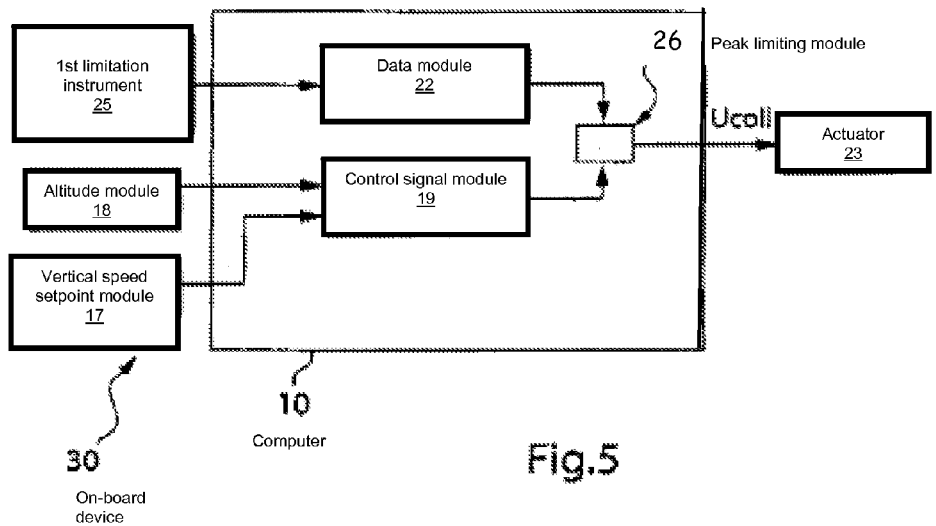

METHOD AND A DEVICE FOR PROVIDING ASSISTANCE IN PILOTING A ROTORCRAFT AT TAKEOFF

The present invention relates to a method of assisting in piloting a rotorcraft at takeoff, and to a device for implementing the method.

The technical field of the invention is that of manufacturing helicopters.

BACKGROUND OF THE INVENTION

Piloting a helicopter close to the ground or close to a takeoff area is difficult, in particular if an engine failure occurs during this stage and if the on-board weight is large.

The pilot must manage the air speed of the aircraft, which, during takeoff, is low and rapidly varying, while simultaneously monitoring the speed of rotation of the main rotor and the path followed. It is necessary to gain speed quickly so as to reach as quickly as possible an air speed that makes it possible to begin climbing and thus escape from obstacles and geographical relief around the takeoff area.

A takeoff is generally performed as follows:
  the helicopter rises a little, to a small height vertically above its takeoff point, with the pilot then accelerating so that the speed of the helicopter reaches a threshold value TOSS (takeoff safety speed); and
  once the helicopter has reached the speed TOSS, it can begin to climb, with said speed TOSS guaranteeing a minimum climb rate of 100 feet per minute (ft/min) on a single engine and enabling the helicopter, even in the event of an engine failure, to overfly a standardized obstacle and continue climbing.

It should be observed that the takeoff safety speed depends essentially on the weight of the aircraft and on atmospheric conditions (pressure and temperature).

Several observations encourage research and development of means for providing assistance in piloting (or indeed automatic piloting) during takeoff:
  piloting is genuinely difficult and on a twin-engine aircraft having modest single-engine performance, the failure of one of the engines during takeoff can become critical;
  the configuration of a takeoff platform is not always compatible with complying with optimum procedures as defined for takeoff: for example it may not be possible to reverse on the platform;
  only a procedure based solely on maneuvers going forwards and upwards can be compatible with all environments; and
  a procedure that is automatic and integrated in an autopilot makes it easier to obtain certification, since the reproducibility and the safety of the procedure are then guaranteed.

Unless stated to the contrary, in the meaning of the present application, the term "twin-engine" covers "multi-engine" and the term "single-engine" covers "multi-engine having at least one engine that is inoperative".

Certain autopilots include a mode enabling a radio altimeter setpoint altitude to be captured and held, as well as enabling a predefined vertical speed to be captured and held; during takeoff, after a decision height has been passed, the autopilot can apply an order to the cyclic pitch control so as to achieve a nose-down attitude of −8°, for example, and then allow speed to increase until the indicated air speed (IAS) reaches a valid value, i.e. a speed close to at least 15 meters per second (m/s); engaging this mode then makes it possible to accelerate until an optimum climb speed (OCS) (frequently written Vy) is reached, which speed may be close to 35 m/s to 40 m/s, with acceleration being about 0.7 meters per second per second (m/s$^2$).

That procedure presents drawbacks:
  acceleration at that level may be satisfactory in twin-engine operation, but it is insufficient in single-engine operation (after a failure);
  piloting the attitude of the aircraft does not allow full advantage to be taken of helicopter performance on takeoff, where said performance is associated directly with the power available, which power varies depending on whether the helicopter is in single-engine operation or in twin-engine operation.

Thus, the use of that mode does not enable single-engine flight to be optimized.

Furthermore, so far as the inventor is aware, there are no systems in existence that enable the value of TOSS to be adjusted, nor any that manage the power of a twin-engine helicopter optimally while flying on a single engine.

Various systems have been proposed for providing assistance in piloting an aircraft during takeoff and/or landing.

U.S. Pat. No. 3,407,654 describes an instrument for piloting on takeoff that implements a first stage of maximum pitch attitude followed by a second stage of maximum acceleration.

U.S. Pat. No. 3,916,688 and FR 2 174 070 describe apparatus for controlling the flight of a vehicle during vertical or short takeoff and landing along a glide path, using a program of constant or variable deceleration.

U.S. Pat. No. 3,945,590 and FR 2 298 822 describe a system for controlling takeoff that is semiautomatic after a run on the ground, and that limits the amplitude or the pitch attitude the pilot can command, and that enables the desired altitude to be reached asymptotically.

U.S. Pat. No. 3,927,306 and FR 2 274 971 relate to apparatus for controlling the flight path of an aircraft, for following a rectilinear path with programmed acceleration along the path until the desired speed is reached.

U.S. Pat. No. 6,527,225 describes a method of automating takeoff of a multi-engine helicopter along a takeoff path that includes a decision point; the flight controls are controlled as a function of differences between the path and the actual position of the helicopter as given by a positioning system (GPS); in the event of an engine failure being detected before the decision point is reached, the automatic pilot controls the cyclic pitch and the collective pitch to cause the aircraft to land; in the event of such a failure being detected after the decision point has been passed, the automatic pilot monitors the speed of the rotor and adjusts the collective pitch to cause the helicopter to follow a different takeoff path.

OBJECTS AND SUMMARY OF THE INVENTION

An object of the invention is to propose a method and a device for piloting a rotorcraft in the vicinity of the ground or a takeoff area, that are improved and/or that remedy, at least in part, the shortcomings and drawbacks of known piloting systems.

In an aspect of the invention, there is provided a method of piloting a rotorcraft having a plurality of engines for driving at least one lift and propulsion rotor, in which method, so long as the rotorcraft has not reached an optimum climb speed (OCS), a pitch attitude control is determined that is adapted for the rotorcraft to accelerate with a profile that varies during takeoff, firstly as a function of elapsed time (e.g. since engaging the corresponding mode of the automatic pilot), and secondly as a function of the operating state of the engines.

In other words, and according to another aspect of the invention, during takeoff, and in particular after a critical point or critical height has been passed, so long as none of the engines is inoperative, and once the mode corresponding to automatic piloting has been engaged by the rotorcraft pilot, a pitch attitude control order is generated so that the acceleration of the rotorcraft follows a first profile or curve having at least a first acceleration value and a second acceleration value distinct from the first acceleration value, and in the event of an engine failing, a pitch attitude control order is generated so that the acceleration of the rotorcraft follows a second profile distinct from the first profile and including at least a third acceleration value and a fourth acceleration value distinct from the third acceleration value.

In a preferred implementation, so long as no engine is inoperative, the pitch attitude order is determined so as to maintain the acceleration of the rotorcraft substantially constant and equal to said first acceleration value (A1) until a takeoff safety speed (TOSS) is reached, and then, once said speed has been reached, the pitch attitude order is determined so as to maintain the acceleration of the rotorcraft substantially constant and equal to said second acceleration value (A2) until an optimum climb speed (OCS) is reached, said second acceleration value being less than said first acceleration value.

In one yet preferred implementation, in the event of an engine failure being detected, the pitch attitude order is determined in such a manner as to maintain the acceleration of the rotorcraft substantially constant and equal to said third acceleration value (A3) until the takeoff safety speed (TOSS) is reached, and then, once a minimum safe height has been reached, said speed is maintained substantially constant, and then on the pilot controlling acceleration, the pitch attitude order is determined in such a manner as to maintain the acceleration of the rotorcraft substantially constant and equal to said fourth acceleration value (A4) until the optimum climb speed (OCS) is reached, said fourth acceleration value being less than said third acceleration value.

In a preferred implementation, said third acceleration value is greater than said first acceleration value; in particular said first and second acceleration values are less than said third acceleration value and are greater than said fourth acceleration value.

In an implementation, a collective pitch control signal (Ucoll) is generated by a relationship having a vertical target that is limited by peak limiting as determined by a relationship having a target of maintaining a maximum power level that is authorized for when the engines are operating in nominal manner, or for maintaining a minimum speed of rotation (Nr) of the lift and propulsion rotor after an engine has failed.

In another aspect of the invention, an (on-board) piloting device for a multi-engine rotorcraft is provided that comprises:

a unit for detecting an engine failure and that delivers an engine failure detection signal;

a unit for measuring or estimating the actual acceleration of the rotorcraft and that delivers an acceleration signal; this unit preferably also estimates the air speed as soon as an air speed measurement becomes available;

a unit for determining acceleration profile data (A1-A4) and a unit for determining target setpoint speed data (IASref); and a module for calculating a pitch attitude order that is connected to the unit for detecting an engine failure, to the unit for measuring or estimating acceleration, and also to the units for determining data in order to receive said signals and data, the calculation module being designed to generate a pitch attitude order that varies as a function of the engine failure detection signal and as a function of the acceleration signal in order to cause the acceleration signal to vary so long as the reference speed has not been reached, in application of an acceleration profile that is determined by at least some of said acceleration profile data.

In a preferred embodiment, the calculation module comprises a processor and a program or code written in a medium such as a memory and including at least a sequence of instructions that are usable (readable and/or executable) by the processor in order to pilot the rotorcraft, the code and/or the instructions determining a pitch attitude control order that is designed to cause the rotorcraft to accelerate in a manner that varies as a function of time and as a function of at least one item of data representative of the state of an engine of the rotorcraft.

This calculation module can be incorporated in an autopilot computer of the rotorcraft.

In other preferred embodiments of the device of the invention:

the calculation module further includes a collective pitch control (Ucoll) module determining a vertical setpoint path either in terms of height Zcom or in terms of vertical speed Vzcom, and generating the control signal from differences between said setpoint and the current state of the rotorcraft as delivered by an altimeter measuring module;

the device includes two modules for generating a collective pitch control signal (Ucoll) in application of two distinct relationships, and a peak limiter module for limiting the control signal from the module by the control signal from another module;

the device further includes an interface enabling the pilot to input data for adjusting the speed TOSS and/or the speed Vy/OCS.

Thus, in another aspect of the invention, a program is provided for piloting a multi-engine rotorcraft in which the instructions enable the operations of a method of the invention to be performed.

In accordance with an aspect of the invention, acceleration is a parameter that is controlled directly, whereas in conventional procedures, it is merely the consequence of attitude control. Direct control over acceleration enables better use to be made of the performance of the aircraft on takeoff and also of its single-engine performance in the event of a failure.

The invention also makes it possible to take account automatically (without pilot intervention)—and immediately—of a TOSS value that can be predetermined before the flight as a function of the takeoff configuration of the aircraft.

This predetermined value can be optimized as a function of the takeoff configuration. In particular, in the event of takeoff from open ground, it is possible to increase the value of the TOSS, provided the ground is long enough. The advantage of such an adjustment is that it enables a speed to be achieved that guarantees a better rate of climb in the event of an engine failure.

The procedure is optimized to cover automatically and immediately operation on a single engine in the event of one engine becoming inoperative (OEI).

The optimum acceleration values (A1 to A4) can be determined by testing in flight or in theoretical manner, taking account of constraints associated with passenger comfort.

The fourth value A4 can be adjusted automatically as a function of the available power margin, for example to a value lying in the range going from about 0.25 m/s$^2$ to about 0.7 m/s$^2$.

The invention makes it possible in particular to optimize missions that involve taking off from an off-shore platform, medical evacuation missions, fjord crossing, helicopter winching, and various military operations.

BRIEF DESCRIPTION OF THE DRAWINGS

Other aspects, characteristics, and advantages of the invention appear from the following description which refers to the accompanying drawings that show preferred embodiments of the invention without any limiting character.

Unless specified explicitly or implicitly to the contrary, the terms "signal" and "data" are considered as being equivalent in the meaning of the present application.

FIG. 1 is an acceleration profile for the rotorcraft when both engines are in operation; FIG. 2 corresponds to an acceleration profile for the same rotorcraft when only one engine is in operation; and FIG. 3 is an acceleration profile for the same rotorcraft when one of its engines fails during takeoff.

In FIGS. 1 to 3 the abscissa axis represents time and the ordinate axis represents the acceleration of the rotorcraft along its path.

FIG. 4 is a block diagram showing the main modules of a device of the invention connected to and in part integrated in an autopilot (A/P), together with the connections between the A/P and detectors and actuators respectively used and controlled in accordance with a method and/or a program of the invention.

FIG. 5 is a block diagram comparable to that of FIG. 4, showing additional autopilot modules for performing collective pitch control.

MORE DETAILED DESCRIPTION

During takeoff, the invention relies on tracking an acceleration profile that is optimum for each helicopter from the point of takeoff until an optimum climb speed has been reached.

Such a profile can be established for twin-engine operation (nominal operation), and for single-engine operation as a result of an engine failure.

These profiles take account of the capacity of the aircraft to accelerate, of the distance or the height available for takeoff, and of passenger comfort, it being understood that passenger comfort will be degraded in the event of an emergency (engine failure).

For takeoff from open ground, the dimensioning parameter is the length available for takeoff. For takeoff from a platform or a pad, the parameter is its height relative to its surroundings.

The value of the takeoff safety speed (TOSS) can be adjusted as a function of this parameter, it being understood that an increase in weight has the effect of increasing the value of TOSS.

Figure 1:
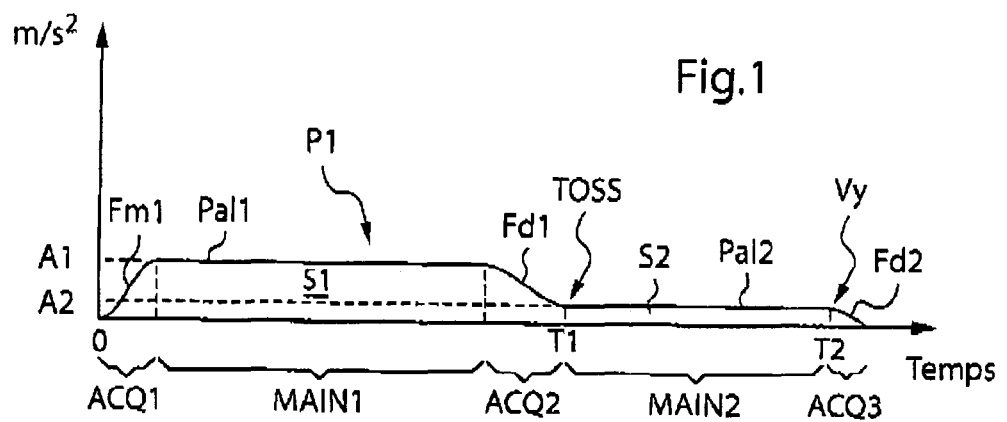
FIGS. 1 to 3 are graphs presenting three profiles of variation in the acceleration to be acquired and maintained in a method of piloting a twin-engine rotorcraft in accordance with the invention.

With reference to FIG. 1, the acceleration profile P1 comprises two successive levels Pal1 and Pal2 corresponding respectively to two acceleration values A1 and A2 of the rotorcraft on its path.

In a procedure of the invention, when both motors of the rotorcraft are in operation, the autopilot (A/P) delivers an order controlling pitch attitude so that the actual acceleration of the rotorcraft follows this profile P1 (FIG. 1) in application of the following sequence:

starting from acceleration that is substantially zero, acquiring ACQ1 the acceleration value A1, which corresponds to the rising front Fm1 in the profile P1;

maintaining MAIN1 the acceleration A1 for a length of time that is sufficient to ensure that the speed of the rotorcraft on its path comes close to the speed TOSS;

acquiring ACQ2 the acceleration value A2, which corresponds to a first falling front Fd1 in the profile P1, enabling the speed TOSS to be reached at the end of a duration T1;

maintaining MAIN2 the acceleration A2 for a length of time that is sufficient to reach the speed Vy (Vy=OCS); and acquiring ACQ3 acceleration that is substantially zero (second falling front Fd2) at the end of a duration T2.

Vy is an estimate of the optimum climb speed. This speed differs little from one aircraft to another; it depends in general on a density indicator which is a normalized ratio of static pressure over static temperature.

TOSS is a parameter determined by testing in flight and by extrapolating from test results. Tables for estimating it prior to takeoff are generally given in the flight manual of a helicopter. This speed generally depends on the on-board weight and also on the height of the platform from which the aircraft is taking off. For certain aircraft, the pilot must note or remember this value; on other aircraft, a nominal value for TOSS guaranteeing a predetermined rate of climb (e.g. 100 feet per minute) using a single engine is calculated (on the assumption that takeoff is from ground level, for example) and is presented to the crew.

On other helicopters, the pilot can set the TOSS as estimated, if it is less conservative than the minimum TOSS evaluated by a computer or the aircraft, for example by adjusting the IAS setpoint that is to be reached, or by adjusting directly the value displayed for TOSS. The greater the weight of the aircraft, the greater TOSS. When taking off from a long runway, it can be preferable to accelerate up to a speed that guarantees a rate of climb that is greater than 100 ft/min, for example. It is particularly under such circumstances that it is advantageous to be able to adjust TOSS.

Figure 2:
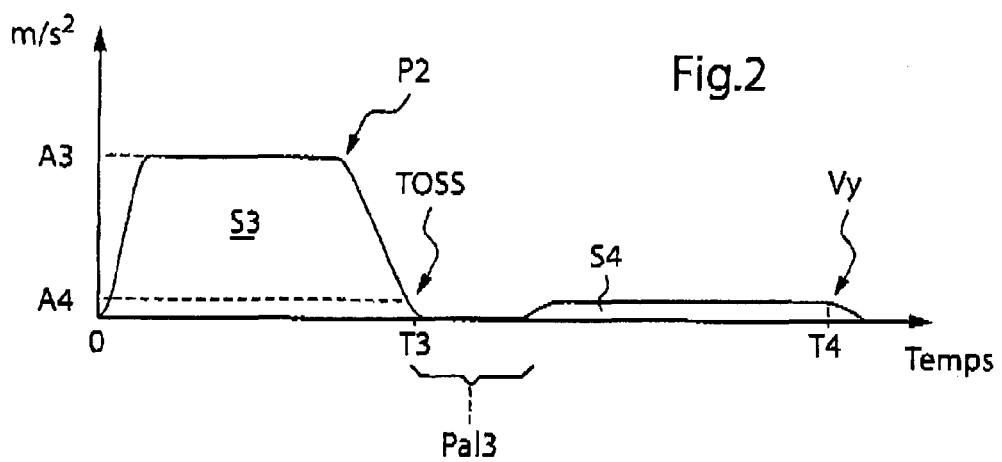

When only one engine is operating, the A/P controls the flight control actuator(s) (in pitch attitude) so that the acceleration follows the profile P2 shown in FIG. 2; the sequence is similar to that described above with reference to FIG. 1.

This profile P2 differs from the profile P1 in two aspects:

firstly by the acceleration values A3 and A4 corresponding to the two levels in the profile P2: the acceleration A3 is greater than the acceleration A1 of P1, while the acceleration A4 is less than the acceleration A2 of the profile P1; correspondingly, the duration T3 and T4 at the end of which the speeds TOSS and Vy are respectively reached by following the profile P2 are likewise different from the durations T1 and T2; and secondly by the fact that a level Pal3 at substantially zero acceleration is implemented once TOSS has been reached; the duration of this level is variable; zero acceleration is maintained until the pilot commands acceleration to restart; when this command is given, acquiring and then maintaining the acceleration A4 are carried out automatically.

Figure 3:
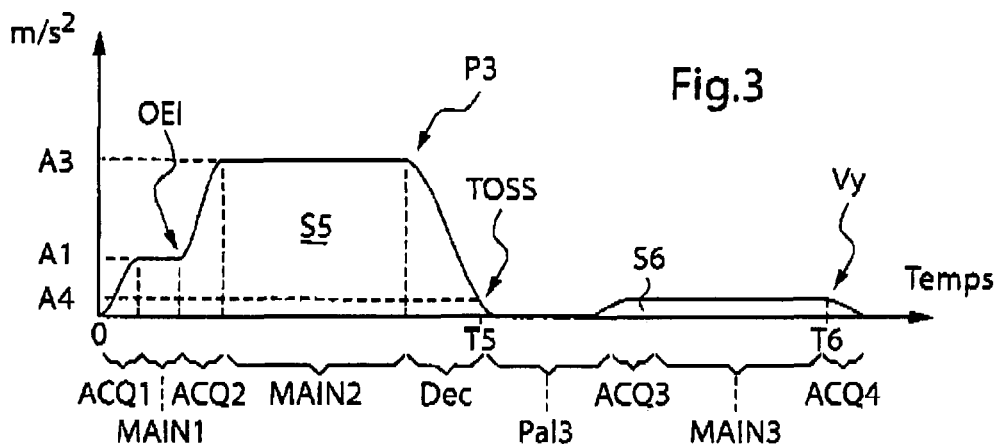

FIG. 3 shows the profile P3 and the particular sequence that is followed when takeoff is begun using both engines in operation, and when an OEI signal indicating that an engine has become inoperative is received by the A/P while the acceleration of the helicopter was at the value A1 of the level Pal1 of the profile P1 (FIG. 1); the profile P3 thus corresponds to the following sequence:

acquiring ACQ1 the acceleration A1 from acceleration that is initially substantially zero;

maintaining MAIN1 the acceleration A1 (of the profile P1) until the appearance of a signal OEI indicating that one of the two engines has become inoperative, thus leading to:

acquiring ACQ2 the acceleration A3 (of the profile P2) and then maintaining MAIN2 that acceleration until reaching a speed that is a little less than TOSS;

reducing acceleration Dec progressively so as to reach the speed TOSS with acceleration that is substantially zero;

climbing Pal3 at zero acceleration up to a minimum safe height as determined by the pilot, and then, on order of the pilot:

acquiring ACQ3 and then maintaining MAIN3 the acceleration A4 (of the profile P2) so as to reduce the power margin to a minimum acceptable value until reaching the speed Vy; then acquiring ACQ4 an acceleration of zero.

It can be observed that the areas S1, S3, and S5 of the surfaces defined firstly by the respective first portions of the profiles P1, P2, and P3 situated between the origin (O) and the durations T1, T3, and T5, and secondly by the abscissa axis are all equal to the value TOSS; similarly, the areas S2, S4, and S6 of the surfaces defined firstly by the second respective portions of the profiles P1, P2, and P3 and secondly by the abscissa axis are equal to the difference between the speeds Vy and TOSS.

The value of TOSS can be adjusted (before takeoff) by the pilot to above or below a reference value calculated by the A/P as a function of local atmospheric conditions and of payload, so as to further optimize the procedure of the invention.

The values A1 to A4 may lie for example in a range going from about 0.2 m/s² to about 4 m/s².

With reference to FIG. 4, the piloting device 30 comprises a computer 10 receiving signal/data from sensors, from memories, and/or from detectors, and delivering a pitch control order (or pitch correction (Upitch)) to an actuator 11.

The computer 10 receives signals or data delivered by:

an interface 24 enabling the pilot to input data for adjusting the speed TOSS and/or the speed Vy/OCS;

a module 18 that can be connected to and/or form part of an altitude measuring unit, and that delivers data relating to altitude, to vertical speed, and/or to the current vertical acceleration of the rotorcraft;

an estimator module 20 using the current indicated air speed (IAS) of the rotorcraft and inertial measurements to determine the current speed and the actual acceleration of the rotorcraft on its path; and a module 21 that can be connected to and/or form part of an attitude and heading unit or an inertial unit, and that delivers current data relating to the roll, to the pitch, and to the yaw of the rotorcraft.

The computer delivers a pitch attitude control signal Upitch to an actuator 11 for controlling cyclic pitch; for this purpose, the computer 10 comprises:

a module or sensor 12 delivering data (AEO) indicating that all engines are operative or on the contrary data (OEI) indicating that one of the engines is inoperative;

a module 13 for determining a reference indicated air speed (IASref), that is connected to the interface 24 to receive the data for adjusting TOSS/Vy;

a gain selector module 14 connected to the module 12 to receive the data OEI/AEO and that responds to this data and to the power margin to output the acceleration values (A1 to A4) of the profile to be followed;

a module 15 for managing the takeoff path on the longitudinal axis; and a module 16 for generating a control signal (pitch attitude correction Upitch) that is delivered to the module 11.

The path management module 15 receives a reference air speed to be reached from the module 13 and it receives the current state (air speed and longitudinal acceleration) of the aircraft as delivered by the module 18.

The module 15 also receives as input a synchronization signal (a binary state requesting the path to be synchronized with the current state during the first calculation cycle and also during manual piloting actions).

The module 15 outputs an altitude setpoint Zcom, a vertical speed setpoint Vzcom, and a vertical acceleration setpoint Γzcom.

These setpoints are calculated from an initial value, in general determined by the current state, so as to join the reference air speed that is to be joined by applying dynamic variations in compliance with maneuvers that are acceptable for the aircraft, with a zero derivative and a zero second derivative; these calculations thus make use of the values A1 to A4 of the profile (P1, P2, or P3) depending on the state of the engines as represented by the output from the module 12.

At its input, the control module 16 receives the setpoints determined by the path management module 15 in terms of acceleration and air speed, and it also receives the current state of the aircraft.

The module 16 outputs one or more piloting orders, in particular signals or data requesting variations in the pitch attitude of the aircraft; these orders are calculated from weighted differences between the setpoints and the current states. This calculation can involve linear processing (e.g. linear filtering) or non-linear processing (e.g. peak limiting) in order to predict the order that is best suited for causing the current states to join their setpoints, with dynamic variations that are acceptable for the aircraft (movements suitably damped, and comfortable for the passengers).

In the event of an engine failure being detected (switch from AEO mode to OEI mode), the TOSS is used as the piloting setpoint speed instead of Vy (the aircraft must do no more than reach TOSS in order to continue safely), and different gains (values A1 to A4) are used for calculating the path, in order to produce a control signal Upitch that is appropriate for one engine being inoperative.

Under certain flying conditions, in particular with large variations in speed as with an attitude having a large amount of pitch, acceleration (power) can turn out to be difficult to control.

A 4-axis type autopilot A/P (controlling collective pitch variations for the main rotor of the helicopter) can then be used to automate reducing collective pitch to a value that makes it possible to maintain a speed of rotation Nr of the rotor that is greater than or equal to a value that gives the best performance of the rotor, in the event of a loss of power due to one of the engines propelling the rotorcraft becoming imperative.

Under such circumstances, the device of the invention includes means (integrated in part in the autopilot) that enable collective pitch to be controlled as well as pitch attitude, which means are shown diagrammatically in FIG. 5.

In nominal (twin-engine) operation, the collective pitch control signal Ucoll delivered to the actuator 23 by the A/P 10 is determined by a piloting relationship having a vertical target, with the setpoint parameters indicated by the pilot; this relationship is implemented in a module 19 of the computer 10 that receives the signals delivered by the modules 17 and 18 to which it is connected: the module 17 delivers a vertical speed setpoint or the height to be reached, and the module 18 delivers the current altitude (or height), vertical speed, and vertical acceleration states.

As shown diagrammatically in FIG. 5, the second relationship is programmed in a module 22 that receives data from a first limitation instrument (FLI) 25; the control signal delivered by the module 19 is peak limited so that its maximum value is no greater than the value from the module 22; this peak limiting is performed in a module 26 that outputs the control signal Ucoll for the actuator 23.

If an engine failure is detected, the limit calculated by the module 22 is reduced so as to comply with the minimum speed Nr, by making use of the information delivered by the first limitation instrument 25.

The first limitation instrument 25 needs to take account of the parameter Nr and to comply with the minimum Nr, in addition to the parameters that are taken into consideration by the usual FLIs that calculate the first limiting parameter selected from engine gas generator speed (Ng), engine torque, and turbine inlet temperature.

What is claimed is:

1. A method of piloting a rotorcraft having a plurality of engines and at least one lift and propulsion rotor, wherein so long as the rotorcraft has not reached an optimum climb speed (OCS), a pitch attitude control signal (Upitch) is determined that is adapted to cause the rotorcraft to acquire and maintain an acceleration (A1, A2, A3, A4) that varies as a function of elapsed time in application of a determined acceleration profile (P1, P2, P3), which profile varies as a function of the engine operating state (OEI/AEO); in which, after the pilot of the rotorcraft has engaged the corresponding automatic pilot mode, and during takeoff, so long as no engine is inoperative, a pitch attitude control signal is generated so that the acceleration of the rotorcraft follows a first profile or curve (P1) including at least a first acceleration value (A1) and a second acceleration value (A2) distinct from the first acceleration value, wherein the acceleration of the rotorcraft is maintained substantially constant and equal to the first acceleration value for a first time interval and the second acceleration value for a second time interval, and in the event of an engine becoming inoperative, the pitch attitude control signal is generated in such a manner that the acceleration of the rotorcraft follows a second profile (P2) distinct from the first profile, and including at least a third acceleration value (A3) followed by a fourth acceleration value (A4) distinct from the third acceleration value, wherein the acceleration of the rotorcraft is maintained substantially constant and equal to the third acceleration value for a first time interval calculated for the second profile (P2) and the fourth acceleration value for a second time interval calculated for the second profile (P2), with activation of the pitch attitude control being initiated by the pilot after a minimum safety height has been acquired relative to obstacles.

2. A method according to claim 1, in which the pitch attitude control order is generated to follow one of the profiles (P1, P2) after a critical height has been reached.

3. A method according to claim 1, in which, so long as no engine is inoperative, the pitch attitude control signal is determined so as to maintain the acceleration of the rotorcraft substantially constant and equal to said first acceleration value so long as a takeoff safety speed (TOSS) has not been reached, and then, when said speed is reached, the pitch attitude control signal is determined so as to maintain the acceleration of the rotorcraft substantially constant and equal to said second acceleration value so long as the optimum climb speed (OCS) is not reached, said second acceleration value being less than said first acceleration value.

4. A method according to claim 1, in which, in the event of an engine failure being detected, a pitch attitude control signal is determined so as to maintain the acceleration of the rotorcraft substantially constant and equal to said third acceleration value so long as a takeoff safety speed (TOSS) has not been reached, and then, when said speed is reached, the pitch attitude control signal is determined so as to maintain said speed constant until receiving an acceleration order from the pilot, and the pitch attitude control signal is then determined so as to maintain the acceleration of the rotorcraft substantially constant and equal to said fourth acceleration value for a second time interval calculated for the second profile (P2) and so long as optimum climb speed (OCS) is not reached, said fourth acceleration value being less than said third acceleration value for a first time interval calculated for the second profile (P2) and.

5. A method according to claim 4, in which said fourth acceleration value is automatically adjusted as a function of the power available.

6. A method according to claim 1, in which said third acceleration value is greater than said first acceleration value.

7. A method according to claim 6, in which said first and second acceleration values are less than said third acceleration value and are greater than said fourth acceleration value.

8. A method according to claim 1, in which the acceleration values (A1-A4) are situated in a range extending from about 0.2 m/s$^2$ to about 4 m/s$^2$.

9. A method according to claim 1, in which a collective pitch control signal (Ucoll) is also determined that varies as a function of the engine operating state (OEI/AEO).

10. A method according to claim 9, in which the collective pitch control signal (Ucoll) is generated by means of a vertical target relationship (19) that is peak limited in a manner determined by a relationship (22) seeking to maintain a maximum authorized power when the engines are operating normally, or to maintain a minimum speed of rotation (Nr) for the lift and propulsion rotor after an engine has failed.

11. A program stored on a non-transitory computer readable medium usable by a multi-engine rotorcraft computer to pilot the rotorcraft, the program enabling the rotorcraft to be piloted in application of a method in accordance with claim 1.

* * * * *